H. SCHUMACHER.
DIRECTION SIGNAL FOR VEHICLES.
APPLICATION FILED OCT. 8, 1914.
1,186,949.
Patented June 13, 1916.
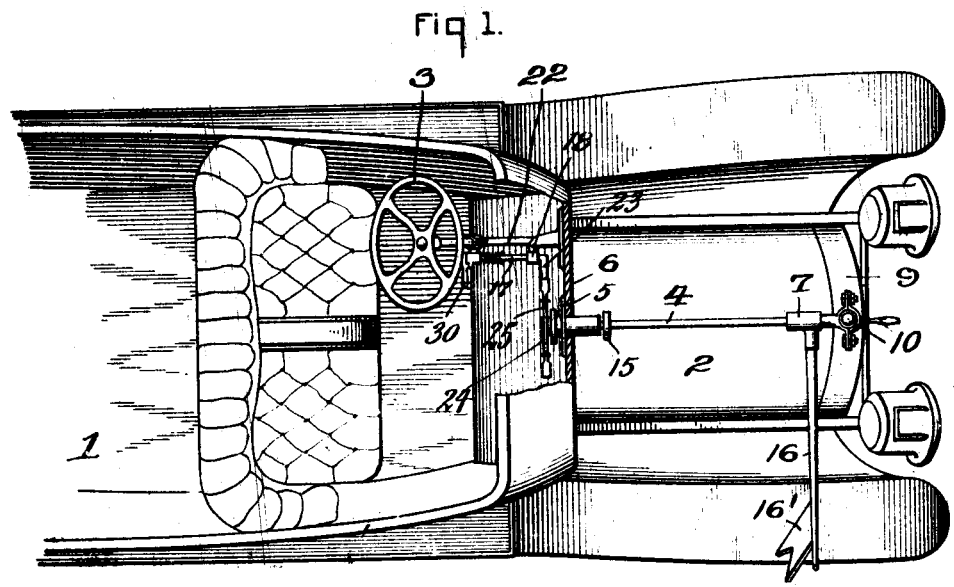
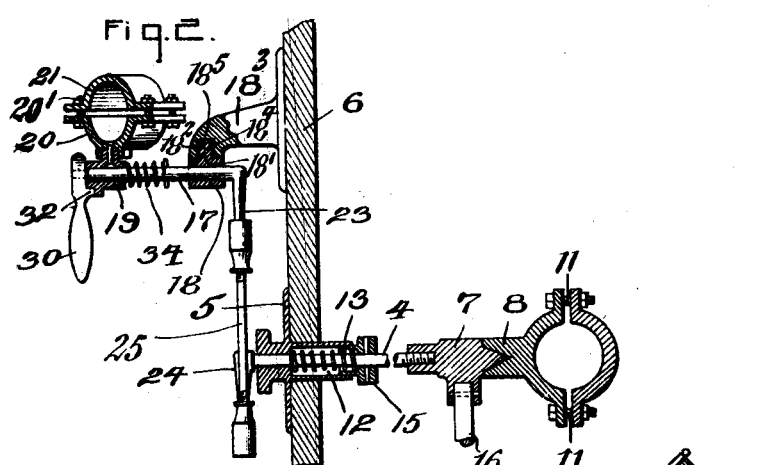
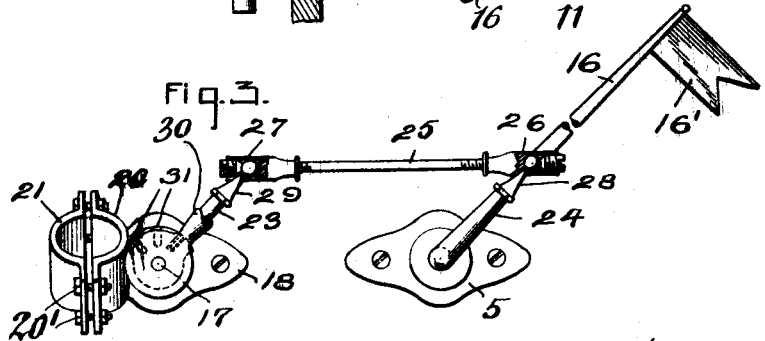
WITNESSES
INVENTOR
Henry Schumacher
by Geyer & Popp
ATTORNEYS

UNITED STATES PATENT OFFICE.

HENRY SCHUMACHER, OF BUFFALO, NEW YORK.

DIRECTION-SIGNAL FOR VEHICLES.

1,186,949.

Specification of Letters Patent.

Patented June 13, 1916.

Application filed October 8, 1914. Serial No. 865,727.

*To all whom it may concern:*

Be it known that I, HENRY SCHUMACHER, a citizen of the United States, residing at Buffalo, in the county of Erie and State of New York, have invented new and useful Improvements in Direction-Signals for Vehicles, of which the following is a specification.

This invention relates to signal or indicating devices for use in connection with vehicles, particularly in connection with automobiles, where it is desirable to indicate the direction in which one intends to turn when rounding a turn.

The object of my invention is to provide a simple and inexpensive device which is within convenient reach of the operator and one which will be automatically locked in the position to which the same is turned.

In the accompanying drawings: Figure 1 is a top plan view of the forward end of an automobile showing my device attached thereto. Fig. 2 is an enlarged horizontal section of the working parts embodying my invention. Fig. 3 is a front elevation of my attachment looking forwardly from the seat of the automobile.

Similar characters of reference indicate corresponding parts throughout the several views.

1 indicates the body of an automobile, 2 the hood and 3 the customary steering wheel.

4 indicates a main longitudinal rock shaft journaled horizontally at its rear end in a suitable bearing 5 mounted on the dash board 6 of the automobile, or other suitable support, and provided in its forward end with a spindle 7 which latter is journaled in a suitable end thrust bearing or socket 8. This bearing or socket is preferably mounted on the radiator 9 by a clamp having two semi-circular sections engaging with opposite sides of the radiator filler 10, one of said clamping sections being preferably formed on the bearing 8 and detachably connected with the companion clamp section by bolts 11. The bearing 5 is of a larger diameter at its outer or front end than at its rear end and is reamed out to form a socket 12 which is adapted to receive a spiral spring 13 surrounding the shaft 4 secured therein under compression by means of a disk 15 keyed to the shaft 4, thus allowing for slight variations in the distance between the dash board and the filler of the radiator and serving to hold the parts together snugly. The spindle 7 is provided at its front end with a laterally swinging arm 16 upon which a flag 16¹ or other visible indicating device may be mounted and which may be turned so as to expose this indicator on either side of the car according to the direction in which the driver intends to turn his automobile.

17 indicates an auxiliary horizontal longitudinal operating shaft journaled at its forward end in a suitable bearing 18 mounted on the dash board 6 while its rear end is journaled in a suitable bearing 19. This last mentioned bearing is preferably pivoted on one section 20 of a clamp engaging with one side of the steering post support 22 of the automobile and connected by bolts 20¹ with the other section 21 of said clamp engaging with the other side of said post. This bearing 19 is preferably pivoted in order that it may be properly attached to steering posts arranged at various angles. The rock shaft 17 is bent up at its front end to form a rock arm 23, while the rock shaft 4 is also bent up at its rear end to form a rock arm 24. The said rock arms are preferably connected together by a link 25 having at opposite ends thereof suitable sockets 26, 27 adapted to receive suitable ball heads 28, 29 of the rock arms 23, 24 respectively.

30 indicates an operating handle pinned or otherwise secured to the inner end of the rock shaft 17. Notches 31 are provided in the inner face of the bearing 19 which are adapted to receive an outwardly projecting lug 32 of the handle 30, these notches being preferably three in number and so spaced as to hold the indicating lever 16 either in a vertical or inoperative position, or in laterally inclined positions toward the right or the left, as the case may be. A spring 34 surrounding the rock shaft 17 serves to draw the lever 30 forwardly, thereby causing the lug 32 to engage with any of the three notches when brought into register with the same, in which position it remains until reset by the driver.

In order to permit of freely raising or lowering the clamping sections 20, 21 on the steering post 22 to suit different drivers without requiring a variety of supports for the shaft 17 on the dash board the bearing 18 is supported so as to be capable of tilting more or less fore and aft of the car. For this purpose the bearing is provided with a horizontal transverse stud 18¹ which is pivoted in a bearing socket 18² in a bracket 18³ secured to the dash board 6, as shown in Fig. 2, and which is confined in said bearing socket by a pin 18⁴ arranged on the bracket and engaging with a circumferential groove 18⁵ in the stud 18¹.

It is obvious from the foregoing description that my improved direction indicator for vehicles enables persons in front as well as in the rear of the respective vehicle to be informed as to the particular direction this vehicle intends to proceed.

From the foregoing it will be seen that I have devised a simple and inexpensive device for signaling automobiles which may be readily attached to any form of car.

I claim as my invention:

1. In a device of the character described, the combination of a bearing adapted to be secured to the dash board of an automobile, a horizontal shaft provided with a spindle at its outer end and supported in said bearing, an end thrust bearing supported on the radiator of said automobile, means to yieldingly maintain said spindle in contact with said thrust bearing, a signal device carried by said spindle, and an auxiliary horizontal shaft provided with a lever having connections with said first mentioned horizontal shaft for transmitting movement thereto.

2. In a device of the character described, the combination of a bearing adapted to be secured to the dash board of an automobile, a horizontal shaft provided with a spindle at its outer end and supported in said bearing, an end thrust bearing supported on the radiator of said automobile, a collar fixed to said shaft, a spiral spring surrounding said shaft between its collar and the bearing on the dash board and adapted to yieldingly maintain said spindle in contact with said end thrust bearing, a signal device carried by said spindle, and an auxiliary horizontal shaft provided with a lever having connections with said first mentioned shaft for transmitting movement thereto.

3. In a device of the character described, the combination of a bearing adapted to be secured to the dash board of an automobile, a horizontal shaft provided with a spindle at its outer end and supported in said bearing, an end thrust bearing supported on the radiator of the automobile, a collar fixed to said shaft, a spiral spring surrounding said shaft between said collar and bearing and adapted to yieldingly maintain said spindle in said end thrust bearing, a signal device carried by said spindle, an auxiliary horizontal shaft journaled at its outer end in a bearing mounted on the dash board and journaled at its inner end in a bearing mounted on the steering post of the automobile, said auxiliary shaft having connection with the first mentioned shaft for transmitting movement thereto, a hand lever attached to the auxiliary shaft and provided with a lug on its outer face, said bearing on the steering post having notches on its face adapted to register with said lug, and resilient means for yieldingly holding the lug in engagement with said notches.

Witness my hand this 7th day of October, 1914.

HENRY SCHUMACHER.

Witnesses:
W. REINHOLD,
THEO. L. POPP.

Copies of this patent may be obtained for five cents each, by addressing the "Commissioner of Patents, Washington, D. C."